(12) United States Patent
Igarashi

(10) Patent No.: US 9,534,881 B2
(45) Date of Patent: Jan. 3, 2017

(54) RING GAUGE WITH MAINTENANCE LINE AND ROUND POINT AND METHOD OF MANUFACTURING THE SAME

(71) Applicant: NIIGATA SEIKI CO., LTD., Tokyo (JP)

(72) Inventor: Toshiyuki Igarashi, Tokyo (JP)

(73) Assignee: NIIGATA SEIKI CO., LTD., Tokyo (JP)

( * ) Notice: Subject to any disclaimer, the term of this patent is extended or adjusted under 35 U.S.C. 154(b) by 281 days.

(21) Appl. No.: 14/170,311

(22) Filed: Jan. 31, 2014

(65) Prior Publication Data

US 2014/0299041 A1    Oct. 9, 2014

(30) Foreign Application Priority Data

Apr. 3, 2013    (JP) .................. 2013-077349

(51) Int. Cl.
*G01B 3/34*    (2006.01)
*G01D 7/00*    (2006.01)

(52) U.S. Cl.
CPC .. *G01B 3/34* (2013.01); *G01D 7/00* (2013.01)

(58) Field of Classification Search
CPC ................................. G01B 3/34; G01D 7/00
USPC ........... 116/208; 33/541, 546, 550–551, 651; 205/52
See application file for complete search history.

(56) References Cited

U.S. PATENT DOCUMENTS

| | | | | |
|---|---|---|---|---|
| 39,346 A * | 7/1863 | Hillman | ................ | B67C 11/04 141/344 |
| 1,294,004 A * | 2/1919 | Weaver | ................ | G01B 3/40 33/199 R |
| 1,507,968 A * | 9/1924 | Johnson | ................ | G01F 19/00 73/427 |
| 1,529,296 A * | 3/1925 | Blood | ................ | G01B 3/48 33/501.45 |
| 1,535,098 A * | 4/1925 | Buckingham | ............ | G01B 3/48 33/199 R |
| 1,672,913 A * | 6/1928 | Schaap | ................ | G01B 5/025 33/542 |
| 1,954,852 A * | 4/1934 | Thomson | ................ | G01B 3/48 33/199 R |
| 3,142,287 A * | 7/1964 | Jones | ................ | G01N 31/222 116/206 |
| D202,368 S * | 9/1965 | Feldman | ................ | D10/46.2 |
| 3,829,977 A * | 8/1974 | Lambert | ................ | G01B 1/00 33/531 |
| 4,216,586 A * | 8/1980 | Long | ................ | G01B 5/12 33/544.4 |

(Continued)

FOREIGN PATENT DOCUMENTS

JP    3125109 U    9/2006

*Primary Examiner* — R. A. Smith
*Assistant Examiner* — Tania Courson
(74) *Attorney, Agent, or Firm* — Holtz, Holtz & Volek PC

(57) ABSTRACT

A ring gauge with a maintenance line, which can reliably and quickly let a user know at an early stage the time for replacement during maintenance of a ring gauge, is provided with a ring gauge body which has, on an inner portion, a hole-shaped measuring portion having a circular shape in a planar view and serving as a reference for various types of measuring devices, a predetermined thickness, an upper surface portion, a lower surface portion, and a wear checking gauge line which can have a linear shape formed on an inner diameter portion of the hole-shaped measuring portion.

1 Claim, 10 Drawing Sheets

(56) References Cited

U.S. PATENT DOCUMENTS

| | | | | |
|---|---|---|---|---|
| 4,356,636 A * | 11/1982 | Roberts | G01B 3/36 | 33/199 R |
| 5,134,783 A * | 8/1992 | Perry | G01B 3/48 | 33/199 R |
| 5,228,478 A * | 7/1993 | Kleisle | F16L 57/06 | 116/208 |
| 5,607,078 A * | 3/1997 | Nordberg | A47G 23/16 | 116/227 |
| 6,523,586 B1 * | 2/2003 | Eromaki | B60C 11/24 | 152/154.2 |
| 6,581,972 B2 * | 6/2003 | Nojima | G09F 3/04 | 215/12.1 |
| 6,769,302 B1 * | 8/2004 | King | G01F 19/00 | 73/426 |
| 6,786,153 B2 * | 9/2004 | Burrow | B41F 31/26 | 101/153 |
| 6,904,941 B2 * | 6/2005 | Howard | F16J 10/04 | 138/128 |
| 7,181,858 B2 * | 2/2007 | Haug | G01B 5/025 | 33/514.1 |
| 7,356,938 B2 * | 4/2008 | Brueckert | B23P 6/00 | 33/199 R |
| 7,877,882 B2 * | 2/2011 | Burr | G01B 3/36 | 33/199 R |
| 7,918,031 B2 * | 4/2011 | Wu | G01B 3/48 | 33/199 R |
| 8,122,612 B2 * | 2/2012 | Knight, III | E04D 11/007 | 33/199 R |
| 8,695,527 B2 * | 4/2014 | Edmond | B64D 45/00 | 116/208 |
| 8,875,411 B2 * | 11/2014 | Al-Dhafiri | G01B 3/26 | 33/21.1 |
| 9,022,143 B2 * | 5/2015 | Dupont | | 175/39 |
| 2005/0029297 A1 * | 2/2005 | Hughes | G01F 19/00 | 222/158 |
| 2005/0241166 A1 * | 11/2005 | Porter | G01B 3/40 | 33/501.19 |
| 2009/0004449 A1 * | 1/2009 | Ban | B23B 27/141 | 428/216 |
| 2011/0192046 A1 * | 8/2011 | Kinziger | A01K 97/00 | 33/759 |
| 2014/0299043 A1 * | 10/2014 | Igarashi | G01B 3/36 | 116/208 |
| 2016/0015598 A1 * | 1/2016 | Provencher | A61J 1/00 | 206/438 |
| 2016/0103060 A1 * | 4/2016 | Igarashi | G01B 3/36 | 116/208 |

* cited by examiner

RING GAUGE WITH MAINTENANCE LINE AND ROUND POINT AND METHOD OF MANUFACTURING THE SAME

FIELD OF THE INVENTION

The present invention relates to a ring gauge with a maintenance line and a round point which has a wear checking gauge line or round point printed on the inner diameter portion of the ring gauge of a hole-shaped measuring portion serving as a reference for various types of measuring devices, and a method of manufacturing the same.

DESCRIPTION OF THE RELATED ART

A ring gauge is conventionally disclosed in Registered Utility Model No. 3125109.

This ring gauge has, on the surface of the gauge body, markings of measurement indices indicating the direction and position of a measurement axis concerning the actual size described above. The direction and position of the measurement axis concerning the actual size indicated by the measurement indices allow the user to easily recognize the printing position of the actual size of a reference gauge hole in zero point adjustment or the like for various types of measuring devices. This can improve zero point adjustment accuracy, which in turn can improve hole drilling accuracy.

CITATION LIST

Patent Literature

[Patent Literature 1] Registered Utility Model No. 3125109

SUMMARY OF THE INVENTION

Problem that the Invention is to Solve

A reference gauge hole 2 forming the ring gauge conventionally disclosed in Registered Utility Model No. 3125109 has no wear checking gauge line formed on the inner diameter portion of the gauge hole 2. For this reason, in the process of repeatedly fitting an accurately processed test object or product into the gauge hole 2 for inspection a certain number of times, it has been difficult to reliably let the user know the time for replacement in maintenance of the ring gauge based on a specific degree of wear of the inner diameter portion of the gauge hole 2.

In contrast to this, unlike the conventionally disclosed ring gauge structure described above, the present invention is configured to reliably and quickly let the user for measurement know the time for replacement in maintenance of a ring gauge at an early stage.

In addition, the present invention can contribute to lossless production by always producing high-precision test objects or products.

Furthermore, the present invention can very easily and reliably form wear checking gauge lines or round points, including long and short lines and round points, on the inner diameter portions of gauge holes by electrolytic etching marking processes.

Means for Solving the Problem

As a means for solving the problem, the invention defined in claim 1 provides a ring gauge with a maintenance line in which in a ring gauge body a which has, on an inner portion, a hole-shaped measuring portion 1 having a circular shape in a planar view and serving as a reference for various types of measuring devices, a predetermined thickness, an upper surface portion 4, and a lower surface portion 5, a wear checking gauge line 3 or 3a or a wear checking round point 3b is formed on an inner diameter portion 2 of the hole-shaped measuring portion 1.

As a means for solving the problem, the invention defined in claim 2 provides a ring gauge with a maintenance line in which the wear checking gauge line 3 formed on the inner diameter portion 2 of the hole-shaped measuring portion 1 has a linear shape.

As a means for solving the problem, the invention defined in claim 3 provides a ring gauge with a maintenance line in which the wear checking gauge line 3 formed on the inner diameter portion 2 is formed into a linear shape between the upper surface portion 4 and the lower surface portion 5 of the gauge body a or a wear checking gauge line 3a having a predetermined length is formed in a circumferential direction.

As a means for solving the problem, the invention defined in claim 4 provides a ring gauge with a maintenance line and a round point in which the wear checking gauge line 3 or 3a is printed inside the circumferential surface portion 2 of the hole-shaped measuring portion 1 with a depth of 0.3 µm to 0.4 µm and a width of 0.2 mm or the wear checking round point 3b is printed inside the inner diameter portion 2 of the hole-shaped measuring portion 1 with a depth of 0.3 µm to 0.4 µm.

As a means for solving the problem, the invention defined in claim 5 provides a ring gauge with a maintenance line and a round point in which the ring gauge body a is formed by using alloy tool steel, a ceramic material, a superhard material, or the like.

As a means for solving the problem, the invention defined in claim 6 provide a method of manufacturing a ring gauge with a maintenance line and a round point, comprising setting a ring gauge body a on a work positioning energization slide table on which a work energization negative electrode connected to a power supply box b which controls a current is set, setting a green stencil which has a cut-out portion having a desired marking pattern and from which an electrolytic solution exudes on a carbon filter with the electrolytic solution being contained in a positive electrode handle connected to the power supply box b, energizing the set positive electrode handle while gripping the handle, and forming a wear checking gauge line 3b by performing a marking process to form a concave shape, in an inner diameter portion 2 of a hole-shaped measuring portion 1 of the ring gauge body a, which has a depth of 0.3 µm to 0.4 µm and a width of 0.2 mm and is blackened or by performing a marking process to form a concave shape, in the inner diameter portion 2 of the ring gauge body a, which has a predetermined length in a circumferential direction, a depth of 0.3 µm to 0.4 µm and a width of 0.2 mm and is blackened, or forming a wear checking round point 3b by performing a marking process without sliding the positive electrode handle to form a concave shape, in the inner diameter portion 2, which has a depth of 0.3 µm to 0.4 µm and a diameter of about 2 mm and is blackened.

Note that printing on a ceramic material is performed by a special printing method such as laser marking.

Effects of the Invention

The invention defined in claim 1 provides a ring gauge with a maintenance line and a round point in which in a ring gauge body which has, on an inner portion, a hole-shaped measuring portion having a circular shape in a planar view and serving as a reference for various types of measuring devices, a predetermined thickness, an upper surface portion, and a lower surface portion, a wear checking gauge line or a wear checking round point is formed on an inner diameter portion of the hole-shaped measuring portion. Therefore, this invention has a merit of being capable of reliably informing the time for replacement in maintenance of the ring gauge by letting the wear checking gauge line or round point having the concave shape, provided on the inner diameter portion of the hole-shaped measuring portion of the ring gauge, wear out and disappear.

In addition, the present invention allows the user to properly replace the ring gauge as the wear checking gauge line or round point wears out as described above, and hence can produce a test object with high accuracy and exhibits high productivity as compared with conventional ring gauges because no defective product is produced.

The invention defined in claim 2 provides a ring gauge with a maintenance line and a round point in which a wear checking gauge line formed on the inner diameter portion of the hole-shaped measuring portion has a linear shape. Therefore, this invention has the same effects as those of the invention defined in claim 1.

The invention defined in claim 3 provides a ring gauge with a maintenance line and a round point on which a wear checking gauge line formed in the inner diameter portion is formed into a linear shape between an upper surface portion and a lower surface portion of the gauge body. Therefore, this invention has the same effects as those of the invention defined in claim 1.

The device defined in claim 4 provides a ring gauge with a maintenance line and a round point in which the wear checking gauge line is printed inside the inner diameter portion of the hole-shaped measuring portion with a depth of 0.3 μm to 0.4 μm and a width of 0.2 mm. Therefore, this invention has the same effects as those of the invention defined in claim 1.

The invention defined in claim 5 provides a ring gauge with a maintenance line and a round point in which the ring gauge body is formed by using alloy tool steel, a ceramic material, a superhard material, or the like. This invention has the same effects as those of the invention defined in claim 1.

The invention defined in claim 6 provides a method of manufacturing a ring gauge with a maintenance line and a round point comprising setting a ring gauge body on a work positioning energization slide table on which a work energization negative electrode connected to a power supply box which controls a current is set, setting a green stencil which has a cut-out portion having a desired marking pattern and from which an electrolytic solution exudes on a carbon filter with the electrolytic solution being contained in a positive electrode handle connected to the power supply box, energizing the set positive electrode handle while gripping the handle, and forming a wear checking gauge line by performing a marking process to form a concave shape, in an inner diameter portion of a hole-shaped measuring portion of the ring gauge body, which has a depth of 0.3 μm to 0.4 μm and a width of 0.2 mm and is blackened or by performing a marking process to form a concave shape, in the inner diameter portion of the ring gauge body, which has a predetermined length in a circumferential direction, a depth of 0.3 μm to 0.4 μm and a width of 0.2 mm and is blackened, or forming a wear checking round point by performing a marking process without sliding the positive electrode handle to form a concave shape, in the inner diameter portion, which has a depth of 0.3 μm to 0.4 μm and a diameter of about 2 mm and is blackened. Therefore, this invention has the same effects as those of the invention defined in claim 1, and has a merit of being capable of very reliably and quickly manufacturing a wear checking gauge line and round point which can reliably inform the time for replacement in maintenance of the ring gauge.

BEST MODE FOR CARRYING OUT THE INVENTION

Figure 1:
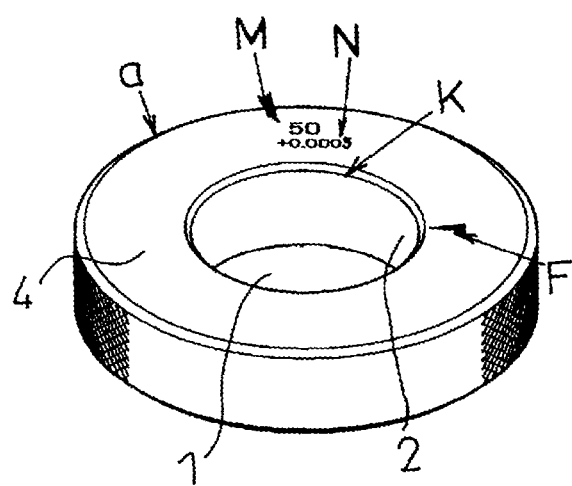
FIG. 1 is a perspective view of a ring gauge with a maintenance line and a round point according to the present invention.
Figure 2:
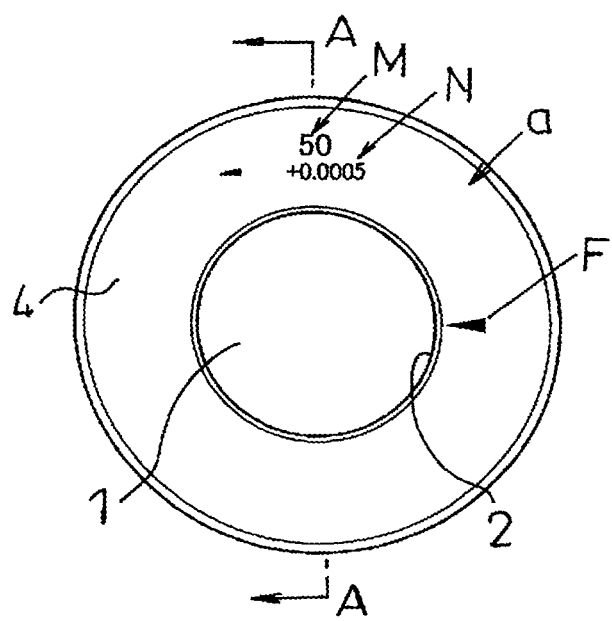
FIG. 2 is a plan view of the ring gauge.
Figure 3:
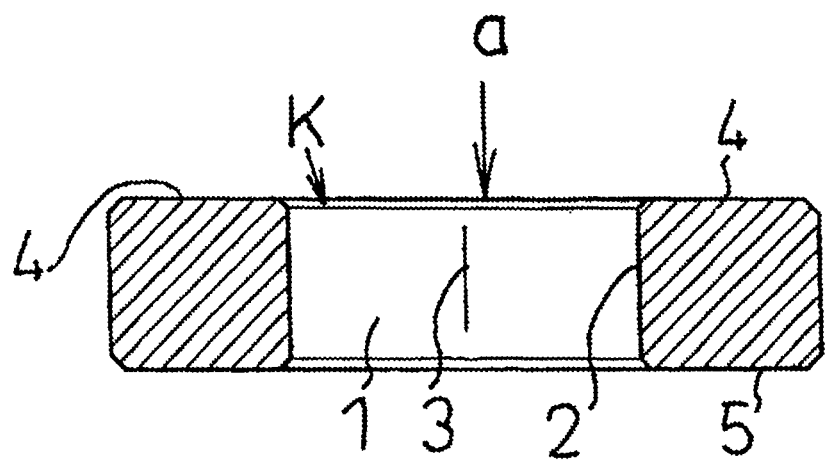
FIG. 3 is a longitudinal sectional view taken along the line A-A in FIG. 2.

The modes for carrying out the inventions defined in claims 1 to 6 of the present invention are common, and hence will be collectively described below.

Referring to the accompanying drawings, reference symbol a denotes a ring gauge body which is made of alloy tool steel, includes a hole-shaped measuring portion 1 having a circular shape in a planar view on the inner portion and serving as a reference for various types of measuring devices, and has a predetermined thickness.

The ring gauge body a generally has a thickness of 15 mm to 50 mm and includes a flat upper surface portion 4 and a flat lower surface portion 5.

A wear checking gauge line 3 is formed on an inner diameter portion 2 of the hole-shaped measuring portion 1 having a circular shape in a planar view, which is the main part of the structure according to the present invention and serves as a reference for various types of measuring devices, between the upper surface portion 4 and the lower surface portion 5 of the ring gauge body a. The wear checking gauge line 3 allows the user to check the degree of wear of the inner diameter portion 2.

The wear checking gauge line 3 can be selectively formed to have any length, and hence is not limited to any specific length.

In addition, as the wear checking gauge line 3 of the present invention, it is possible to form a wear checking gauge line 3a having, for example, a length of about ⅛ the circumference in the inner diameter portion 2 in the circumferential direction, i.e., in a direction parallel to the upper surface portion 4.

A round point 3b may be formed at a predetermined position on the inner diameter portion 2 of the hole-shaped measuring portion 1 by printing.

The wear checking gauge line 3 or 3a are printed inside the inner diameter portion 2 of the hole-shaped measuring portion 1 with a depth of 0.3 μm to 0.4 μm and a width of 0.2 mm.

The wear checking round point 3b may be printed inside the inner diameter portion 2 at a predetermined position on the inner diameter portion 2 of the hole-shaped measuring portion 1 by performing a marking process to form a concave shape with a depth of 0.3 μm to 0.4 μm and a diameter of about 2 mm and blacken the point.

Figure 4:
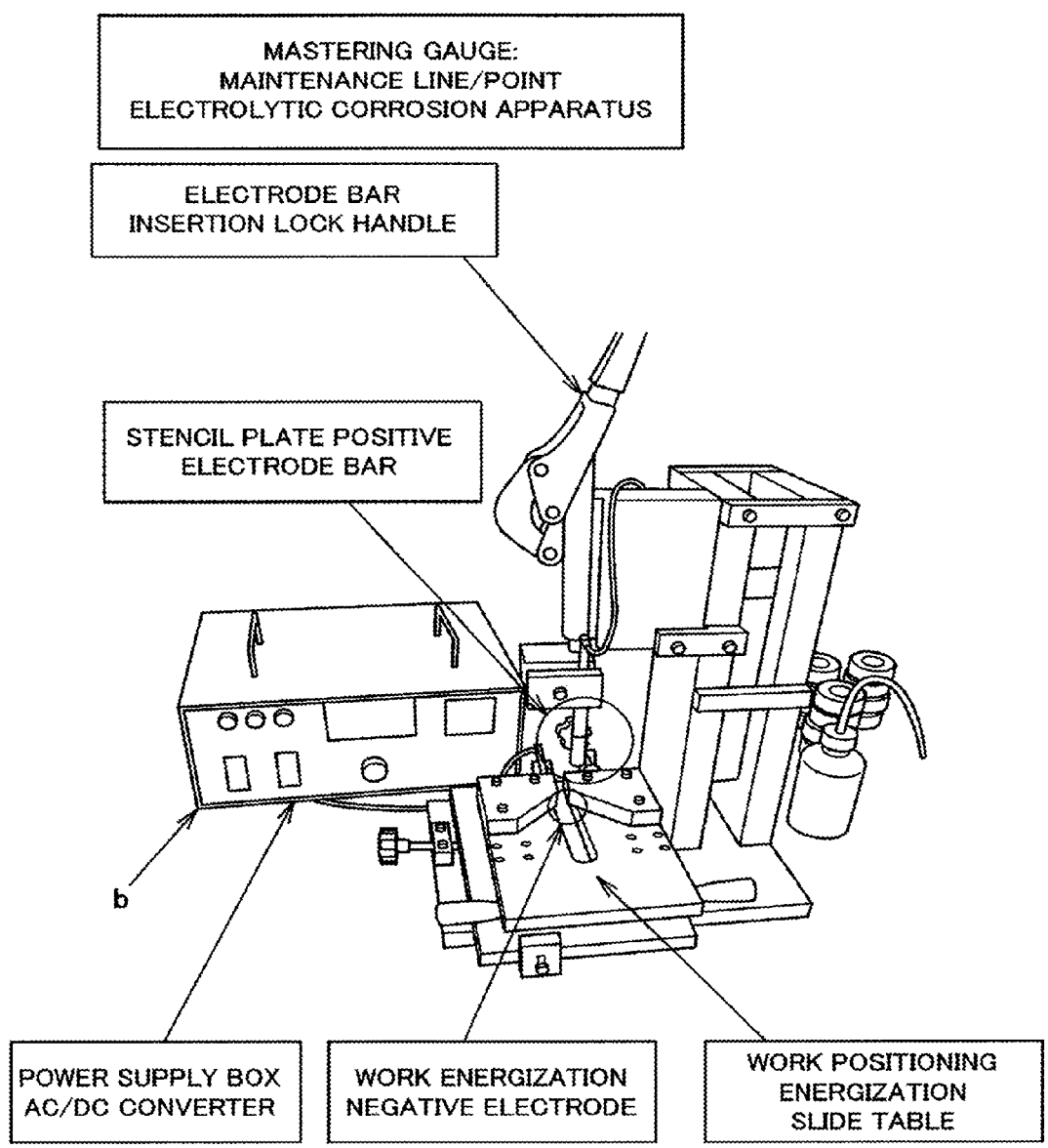
FIG. 4 is a perspective view of an electrolytic corrosion apparatus for forming a maintenance line and a round point on the ring gauge with the maintenance line and the round point in FIG. 1.
Figure 5:
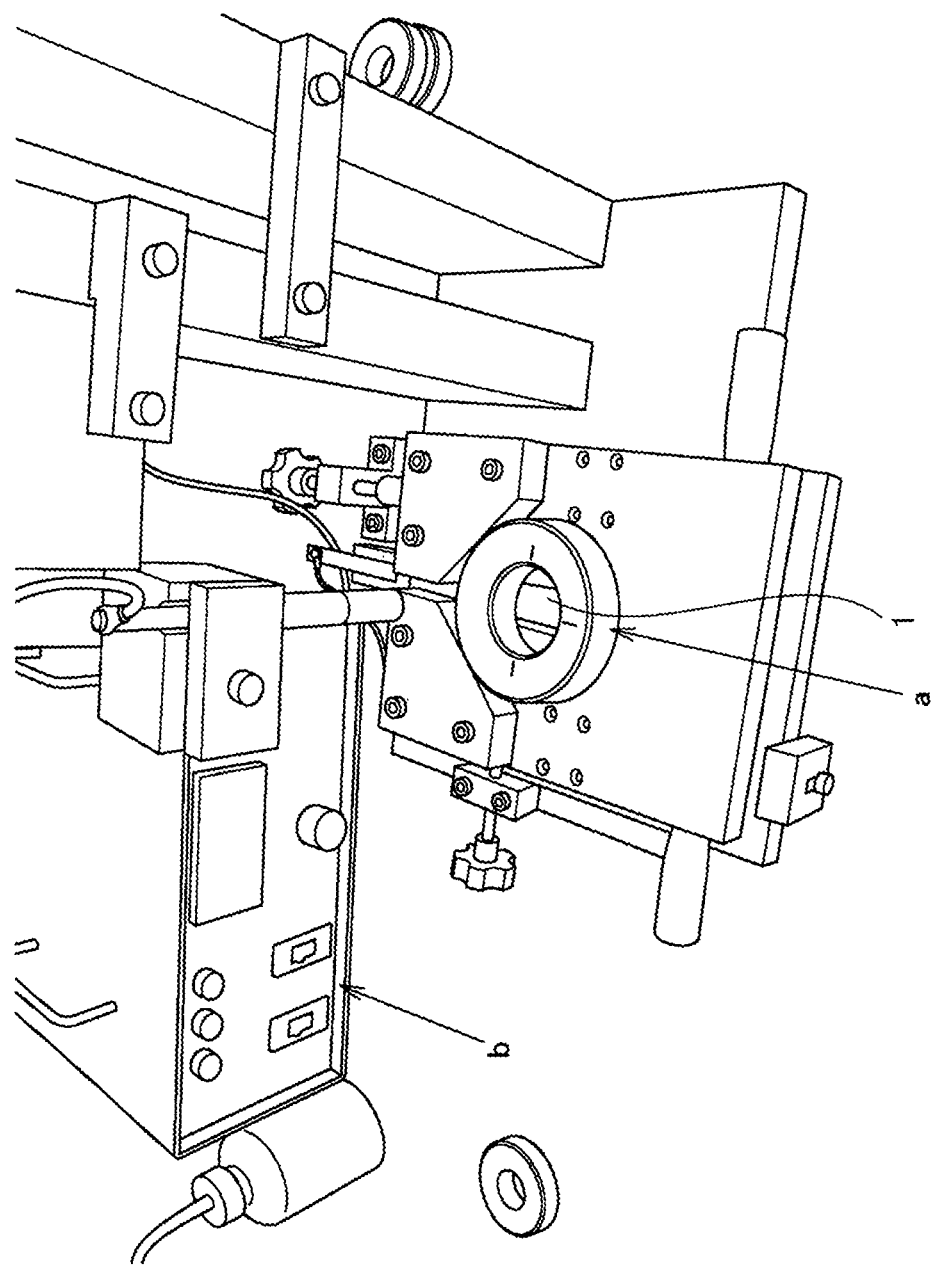
FIG. 5 is a perspective view of the electrolytic corrosion apparatus in FIG. 4 in a state in which a ring gauge body is set in the apparatus before electrolytic corrosion.
Figure 6:
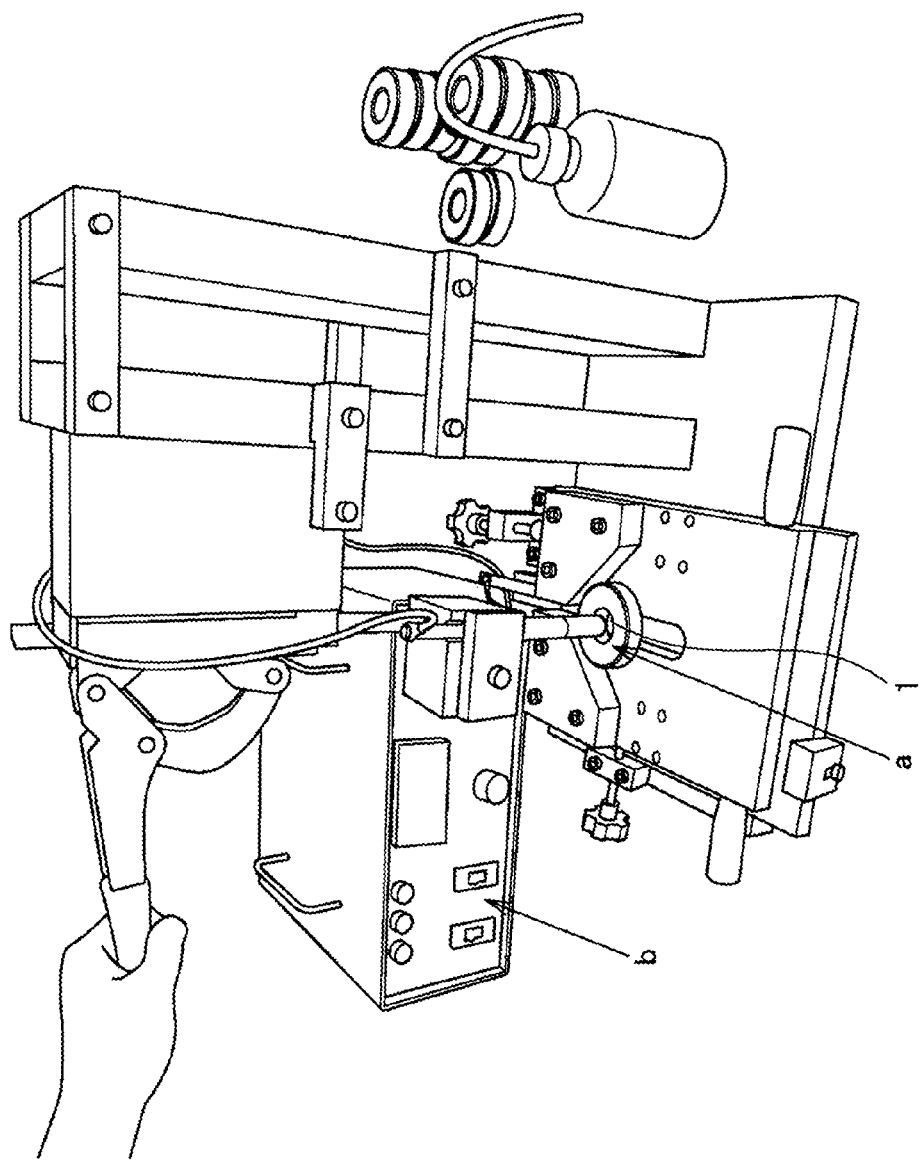
FIG. 6 is a perspective view of the corrosion apparatus in a state in which the apparatus in the state in FIG. 5 has entered a marking process step.
Figure 7:
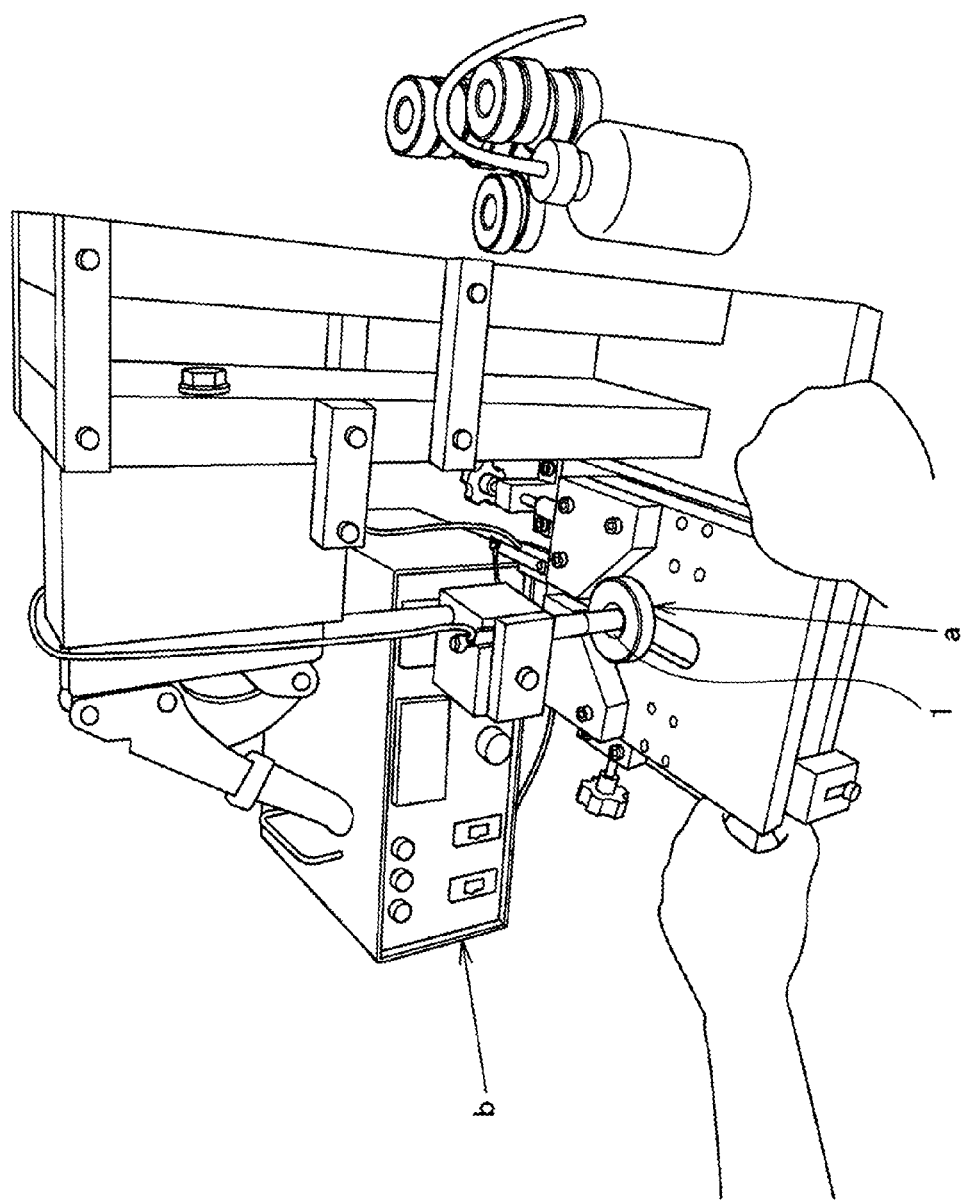
FIG. 7 is a perspective view of the apparatus in a state in which the apparatus in the state in FIG. 6 has completed a marking process, and the user is pulling the ring gauge body closer to himself/herself.

The wear checking gauge lines 3 and 3a and the wear checking round point 3b are formed by using the electrolytic corrosion apparatus shown in FIG. 4. A specific embodiment will be described below.

First, the ring gauge body a is set on a work positioning energization slide table on which a work energization negative electrode connected to a power supply box b which controls a current is set.

A green stencil which has a cut-out portion having a desired marking pattern and from which an electrolytic solution exudes is set on a carbon filter with the electrolytic solution being contained in a positive electrode handle connected to the power supply box b.

While the user grips the positive electrode handle set in the above manner, the handle is energized.

Figure 8:
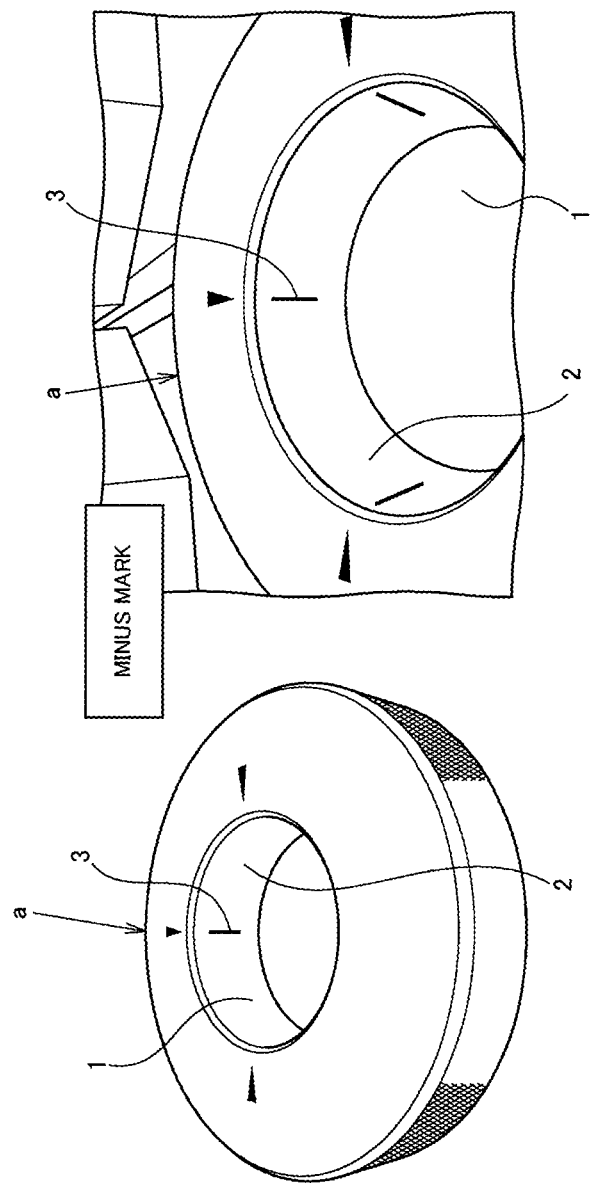
FIG. 8 shows views on the left and right sides, i.e., a perspective view (left) of a ring gauge body on which a linear gauge line marked and an enlarged perspective view (right) of the ring gauge body.
Figure 9:
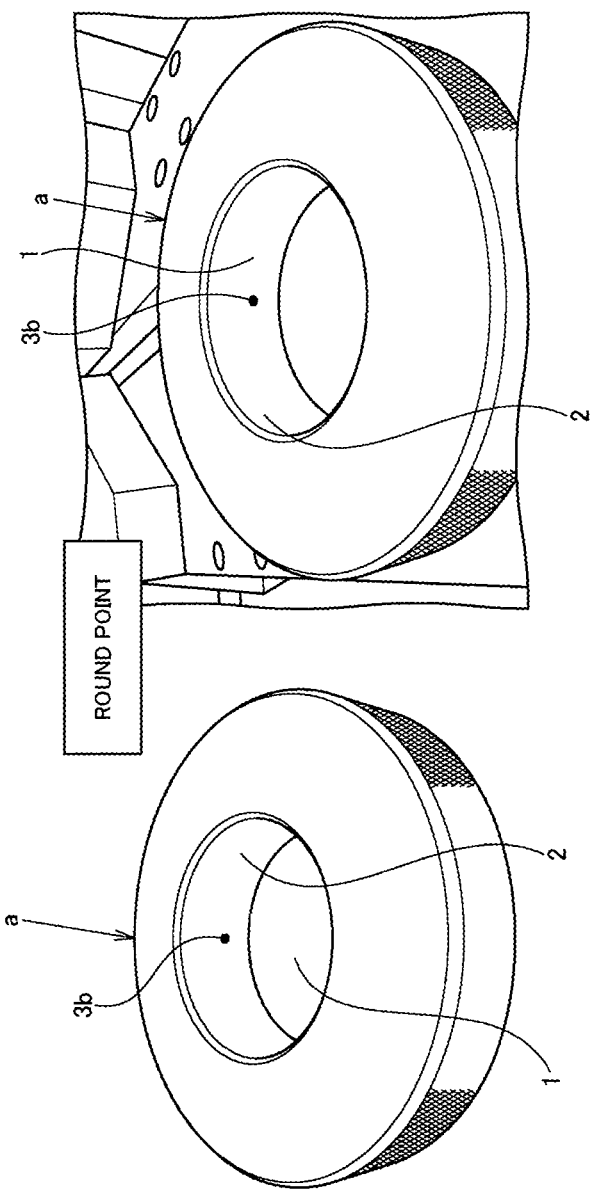
FIG. 9 shows views on the left and right sides, i.e., a perspective view (left) of a ring gauge body on which a round point is printed and an enlarged perspective view (right) of the ring gauge body.

At this time, the linear wear checking gauge line 3 which is blackened is formed in a concave shape with a depth of 0.3 μm to 0.4 μm and a width of 0.2 mm on the inner diameter portion 2 of the hole-shaped measuring portion 1 between the upper surface portion 4 and the lower surface portion 5 of the ring gauge body a (FIG. 8).

Figure 10:
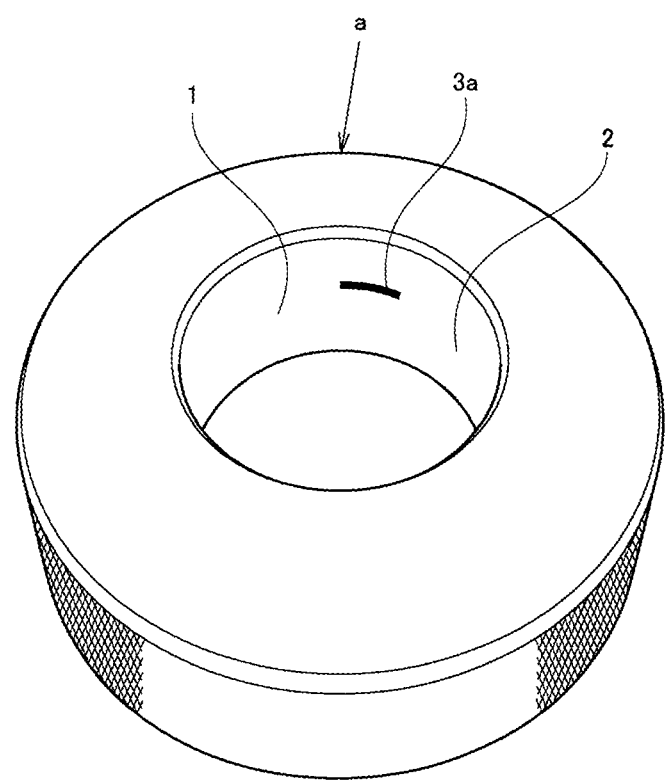
FIG. 10 is a perspective view of a ring gauge body on which a gauge line is printed in the circumferential direction.

Alternatively, a marking process is performed to print the wear checking gauge line 3a, on the inner diameter portion 2 of the ring gauge body a, in a concave shape with a predetermined length (e.g., ⅛ the circumference) in the circumferential direction, which has a depth of 0.3 μm to 0.4 μm and a width of 0.2 mm like the above gauge line and is blackened (FIG. 10).

As described above, the ring gauge body a is set on the work positioning energization slide table on which the work energization negative electrode connected to the power supply box b which controls a current is set. A green stencil which has a cut-out portion having a desired marking pattern and from which an electrolytic solution exudes is set on the carbon filter with the electrolytic solution being contained in the positive electrode handle connected to the power supply box b. While the user grips the positive electrode handle set in the above manner, the handle is energized. The positive electrode handle is kept at rest for about 2 sec without being slid. With this operation, the round point 3b can be printed at a predetermined position on the inner diameter portion 2 of the hole-shaped measuring portion 1.

The round point 3b formed in the above manner can be printed as the wear checking round point 3b.

The ring gauge body a is formed by using alloy tool steel, a ceramic material, a superhard material, or the like.

Note that printing on a ceramic material is performed by a special printing method such as laser marking.

Referring to the accompanying drawings, the outer circumferential surface of the ring gauge body a is knurled, and a normal size M is marked as the value of an inner diameter D of the hole-shaped measuring portion 1 on the upper surface portion 4. In this case, since the inner diameter D is 50 mm, "nominal 50" is marked as the nominal size M. In addition, "actual+0.0001" is marked as an error value N.

Reference symbol F denotes a triangular blackened mark indicating the gauge line 3, which is formed by a laser printing process or the like; and K, an intersecting position.

A method using the ring gauge with the maintenance line or round point formed in the above manner is a measurement method in which a workpiece is inserted into the hole-shaped measuring portion 1 to perform comparative measurement, and they are always in friction. As the frequency of friction increases, wear starts from the insertion end portion of the measuring portion 1, resulting in wear of the gauge line 3 or 3a or round point 3b. This allows the user to reliably check the trouble of being incapable of maintaining the quality of the ring gauge.

That is, marking and forming the wear checking gauge line 3 or 3a or round point 3b on the inner diameter portion 2 of the hole-shaped measuring portion 1 of the ring gauge body a between the upper surface portion 4 and the lower surface portion 5 of the ring gauge body a allows the user to check wear of the wear checking gauge line 3 or 3a or round point 3b. This make it possible to very easily and reliably determine/check the maintenance of high accuracy.

When, therefore, the user can check wear of the wear checking gauge line 3 or 3a or round point 3b, the maintenance line (the time for gauge replacement) makes the user know the wear.

REFERENCE SIGNS LIST a ring gauge body
1 hole-shaped measuring portion
2 inner diameter portion
3 wear checking, gauge line
3a wear checking gauge line
3b wear checking round point
4 upper surface portion
5 lower surface portion
F measurement index
K intersecting position
M nominal size
N error value

What is claimed is:

1. A method of manufacturing a ring gauge comprising:
setting a ring gauge body on a work positioning energization slide table on which a work energization negative electrode connected to a power supply box which controls a current is set;
setting a green stencil which has a cut-out portion having a desired marking pattern and from which an electrolytic solution exudes on a carbon filter with the electrolytic solution being contained in a positive electrode handle connected to the power supply box;
energizing the positive electrode handle while gripping the handle; and
one of: (i) forming a wear checking gauge line by performing a marking process to form a concave shape, on an inner diameter portion of a hole-shaped measuring portion of the ring gauge body, which has a depth of 0.3 μm to 0.4 μm and a width of 0.2 mm and is blackened, (ii) forming a wear checking gauge line by performing a marking process to form a concave shape, on the inner diameter portion of the hole-shaped measuring portion of the ring gauge body, which has a predetermined length in a circumferential direction, a depth of 0.3 μm to 0.4 μm and a width of 0.2 mm and is blackened, and (iii) forming a wear checking round point by performing a marking process without sliding the positive electrode handle to form a concave shape, on the inner diameter portion of the hole-shaped measuring portion of the ring gauge body, which has a depth of 0.3 μm to 0.4 μm and a diameter of substantially 2 mm and is blackened.

* * * * *